United States Patent [19]
Lobb

[11] 3,807,849
[45] Apr. 30, 1974

[54] VISUAL DISPLAY ARRANGEMENTS

[75] Inventor: Daniel Richard Lobb, Farnborough, England

[73] Assignee: Redifon Limited, London, England

[22] Filed: Apr. 23, 1971

[21] Appl. No.: 136,793

[30] Foreign Application Priority Data
May 15, 1970 Great Britain.................... 23677/70

[52] U.S. Cl..................... 353/98, 350/104, 350/55, 353/38, 353/10
[51] Int. Cl. ........................................... G03b 21/28
[58] Field of Search............. 353/98, 99, 81, 10, 11, 353/12; 350/144, 6, 162, 169, 174, 55, 104, 172; 35/12 N

[56] References Cited
UNITED STATES PATENTS
| | | | |
|---|---|---|---|
| 1,419,901 | 6/1922 | Wyld | 353/10 |
| 2,482,115 | 9/1949 | Laird | 353/10 |
| 3,432,219 | 3/1969 | Shenker et al. | 350/55 |

*Primary Examiner*—Harry N. Haroian
*Attorney, Agent, or Firm*—Larson, Taylor & Hinds

[57] ABSTRACT

Visual display apparatus, particularly for an aircraft flight simulator or other vehicle motion simulator, providing a wide-angle, collimated visual display for one or more observers, for example trainee pilot and co-pilot. The apparatus includes an optical projector, a large concave mirror and a curved optical element between the observer and the mirror. The projector projects an image onto the optical element, the image being viewed after reflection, and collimation, by the mirror. The optical element is of special construction so that it serves as a projection screen but permits reflected light from the mirror to pass therethrough. In one particular construction, the optical element is a spherical surface having strip-like diffusing and deflecting grooves with intermediate window strips.

15 Claims, 6 Drawing Figures

VISUAL DISPLAY ARRANGEMENTS

This invention relates to visual display arrangements and to optical components for use in such arrangements.

The invention is concerned generally with arrangements for presenting to observes a visual display simulating a real-life scene and is particularly concerned with visual display arrangements for vehicle simulators.

For clarity and convenience, the invention will be described in relation to ground-based aircraft flight simulation apparatus. A requirement of such apparatus is to present the visual display to a member or members of a trainee crew, for example to the pilot and co-pilot seated in side-by-side relationship in a dummy flight deck.

In known visual display arrangements for flight simulators, the scene displayed may be provided by the projection of cinematograph film or by a television projection receiver, in a closed-circuit television system, supplied with a signal from a television camera. The camera is mounted for viewing, and for movement in relationship to, a scale model of terrain over which a simulated flight occurs.

In such a television system, a natural colour visual display may be provided using a colour television camera and a single colour television projector or three television projectors, one for each of the three colour channels.

A third method which may be used for provision of the scene displayed is by scanning intensity-modulated laser beams over an optical projection screen.

In visual display apparatus commonly used hitherto, the picture to be presented has simply been projected onto a diffusing screen disposed in front of the observer. This simple arrangement has two serious disadvantages. Firstly the observers can become aware that the image presented is much closer to them than is the scene in a real flying situation. Secondly, since the screen is not far distant from the observers, it is not possible to arrange for more than one observer to see image points in a correct angular relationship relative to his own simulated position.

A major improvement in flight simulation and similar display systems can therefore be achieved by providing collimation of the displayed image, that is by making all image points appear to be at infinity. The problem of providing collimation is complicated by requirement for a wide field of view. Optical systems are known which will provide, for a single observer, collimated light from a wide field of view Hitherto, however such systems have not been capable of providing collimated beams so wide that two or more subjects may view the scene simultaneously.

The object of this invention is to provide improved visual display arrangements having regard to the requirements mentioned.

Accordingly, a visual diaplay arrangement for presenting a visual image to at least one observer comprising an optical projector, a concave mirror disposed to direct light to the view point of the observer, optical means, located substantially in the focal surface of said mirror, for redirecting light associated with a real image formed by said projector, onto said mirror, to cause said mirror to form a virtual image at infinity, from said observer's viewpoint, said optical means being constructed to permit at least part of the light collimated by said mirror to pass therethrough towards the observer substantially without deflection.

Such an arrangement can provide visual display for more than one observer.

The mirror can be a spherical mirror with its centre of curvature close to the viewpoints of the observers and the aforesaid means can be likewise curved, with a radius of curvature about one half that of the mirror, and disposed with its centre of curvature substantially coincident with the centre of curvature of the mirror.

The optical means can be an essentially static and non-varying optical element.

Such an optical element can take the form of a transparent concave sheet provided with grooves separated by window areas on one side. The grooves face the mirror and each groove can have two mutually-inclined defining surfaces one of which is made opaque. The other of said surfaces of the grooves can be corrugated to produce scatter. Light projected from the projector, which is disposed on the concave side of the sheet, remote from said grooves, is scattered and deflected by the grooves and re-directed radially towards the mirror. The light reflected from the mirror then passes through the window areas to the observer and is essentially undeflected.

In an alternative embodiment, the light from the projector is initially reflected from the mirror and this light is then reflected and scattered by the optical element or concave sheet in a generally radially direction to be finally re-reflected by the mirror to emerge through the window areas of the sheet. The optical element used in this alternative embodiment can again be an essentially static non-varying optical element which has a number of opaque prisms mounted on one face facing the mirror. The prisms are provided with light reflective outer surface coatings and the areas between the prisms again form the window areas.

The optical element can alternatively be in the form of a diffraction grating or a hologram. The diffracting grating or hologram can be designed to deflect and/or scatter a proportion of the light initially incident on it in a substantially radial direction towards the mirror, and to transmit a proportion of the returning, collimated light to the subject or subjects without deflection.

In another embodiment, the optical element can be a concave sheet composed of layers. An internal interface between the layers can have a sawtooth-like shape and be provided with a semi-reflecting coating, for example a thin layer of aluminium. The interface is so designed that part of the incident beam, which is initially reflected by the mirror, is deflected and/or scattered in a substantially radial direction back towards the mirror. The refractive indices of the media or either side of the semi-reflecting interface are made equal, so that the part of the collimated light which is transmitted by the sheet, is undeflected thereby.

Where the means for scattering and/or deflecting the light is in the form of a static and non-varying optical element, as described above, a proportion of the radiation initially incident on the element is generally transmitted without deflection, and a proportion of the collimated light returning to the means after reflection from the mirror is generally deflected and scattered. These proportions of unused light, however, are not generally directed towards the observers' view points and do not therefore seriously degrade the image presented thereto.

The means may also operate by changing its characteristics with time, for example, by bodily movement of the means itself or by transient change in its internal composition or chemistry.

In this case, the light arriving at areas of space occupied continuously or intermittently by the optical means is for brief successive periods deflected and/or scattered and for brief intervening periods permitted to pass without deflection. Where the projector is operated by a closed circuit television system the means can be a moveable concave sheet member provided with a relatively coarse array of areas adapted to deflect and/or scatter incident light and window areas for allowing direct transmission of light. The movement of such a sheet member can be so controlled that the subject is not aware of the coarse structure of the dissimilar areas.

Where the projector is operated by a laser beam scanning system with a fast vertical line scan and a slower horizontal frame scan, the aforesaid optical means may take the form of a curved strip of material treated to provide a light-scattering surface. The strip is disposed vertically and rotated about a vertical axis passing through the centre of curvature of the mirror in synchronism with the horizontal scan of the beam omitted by the projector, so that the laser beam scans continuously along the strip. The strip thus serves to direct this beam onto the mirror as mentioned before. The beam reflected by the mirror is then again directed to the viewpoint of the subject or subjects and passes on one or both sides of the strip.

The optical means may also change its characteristics with time without moving. For example, the means may be composed of, or include, a photochromic material which is generally transparent but which becomes momentarily opaque when activated by high intensity light, preferably a laser beam, to give the necessary deflecting and/or scattering effect for the initially incident light.

In order that the invention may readily be carried into practice, a number of embodiments of the invention will now be described in detail, by way of examples only, with reference to the accompanying drawings, wherein.

Figure 1:
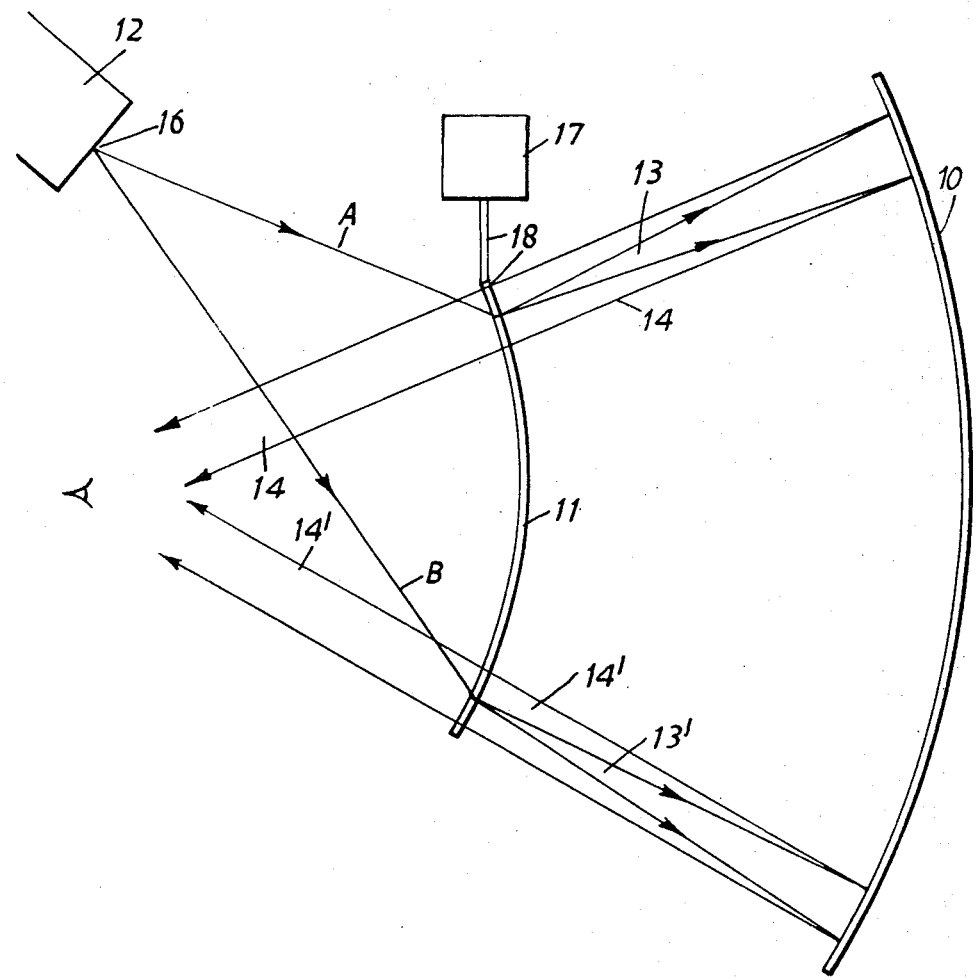
FIG. 1 is a diagrammatic representation of a first display arrangement made in accordance with the invention.

FIG. 1 of the accompanying drawings depicts the more general details of one form of visual display arrangement made in accordance with the invention.

As shown in FIG. 1, a large spherical mirror 10 is positioned with its centre of curvature disposed in a line which is use extends between the viewing positions of trainee pilot and co-pilot observers. A further optical element 11, which will be described more fully hereinafter, having a spherical or near spherical shape of about one half the radius of curvature of the mirror 10 and substantially concentric with the mirror 10 is positioned between the trainee crew and the mirror 10.

A projector 12 which has an exit pupil 16 is disposed above the centre of curvature of the mirror 10 and forms a real image of a simulated scene on the element 11. The element 11 is constructed to deflect and/or scatter incident light in a substantially radial direction towards the mirror 10. The projector 12 in this example is a television projector but may alternatively be a cine-projector or alternatively the projector 12 may operate by scanning intensity modulated laser beams.

In the drawing, the lines A and B represent two projector beams. The projected light is transmitted as a divergent beam 13 from the element 11 in a generally radial direction and this beam 13 is reflected as a collimated beam 14 from the mirror 10. A proportion of the beam 14 is then transmitted through the element 11 to form a virtual image at infinity, so far as the trainee observers are concerned. The numerals 13' 14' denote the beams corresponding to 13 and 14 but produced by the incoming beam B. A further proportion of the beam 14 is deflected and/or scattered by the element 11 substantially in a direction which takes it, via the mirror 10, towards the projector 12. This light is however lost and does not degrade the image seen by the observers.

Figure 2:
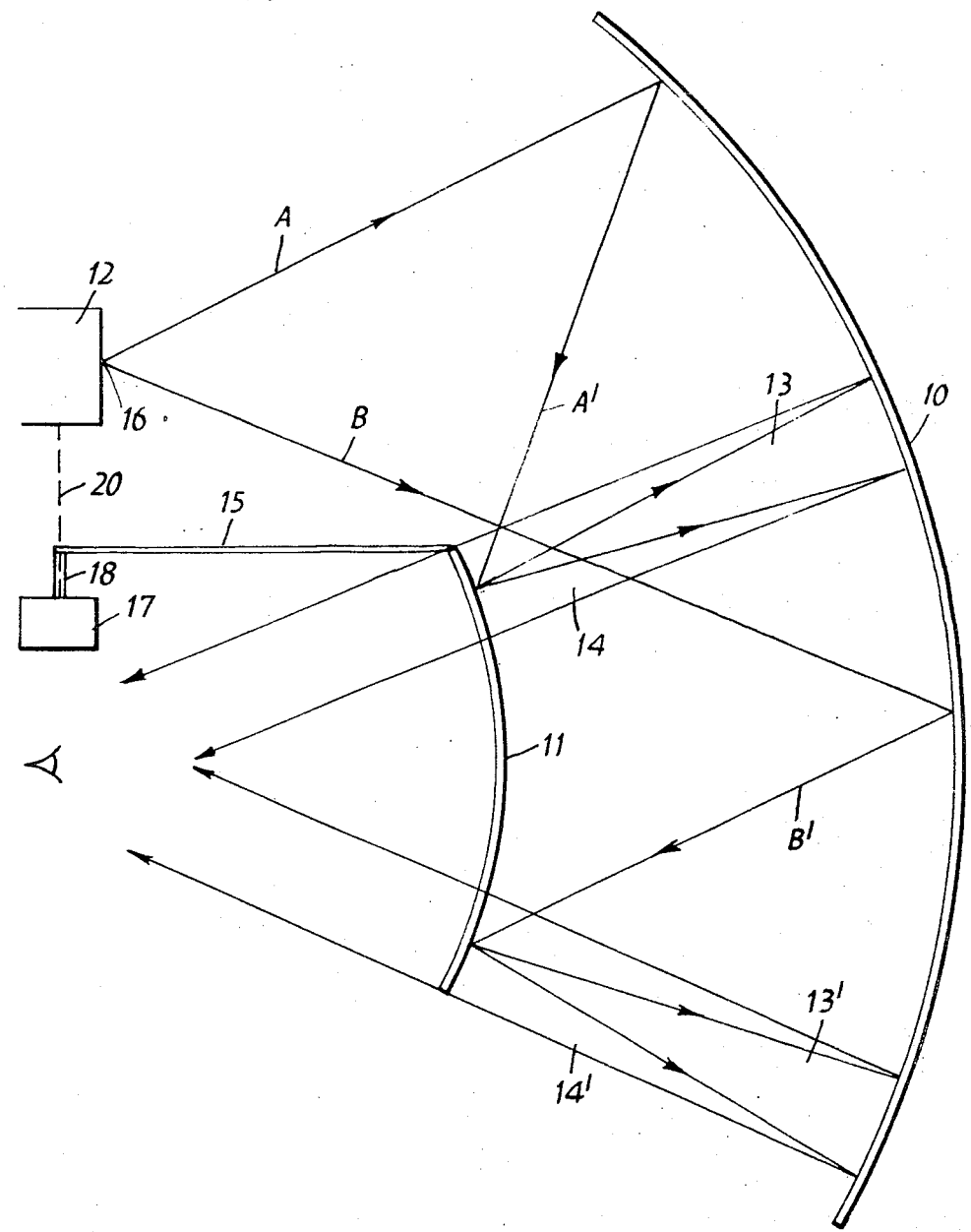
FIG. 2 is a diagrammatic representation of a second display arrangement made in accordance with the invention.

An alternative arrangement is depicted in FIG. 2, where like reference numerals are used to denote like parts. In this arrangement, in contrast to that shown in FIG. 1, the light emitted from the projector 12 and again designated beams A and B is initially directed onto the mirror 10 from whence it is reflected, as beams A' B', onto the element 11. Thereafter, the light is reflected in a divergent manner in a generally radial direction by the element 11 to form beams 13, 13' passing back to the mirror 10. The light beams 13, 13' re-reflected by the mirror 10 are again collimated and a proportion of this light is transmitted through the element 11 towards the subjects as beams 14, 14'. A further proportion of the collimated light may be deflected and/or scattered by the element 11 and passed back to the projector 12 via the mirror 10, that is away from the observers.

The element 11 in the arrangements shown in FIGS. 1 and 2 can be constructed in a variety of ways as will now be described.

In the arrangement depicted in FIG. 1, the element should deflect and scatter the incoming beam (A,B) from the projector 12 onto the mirror 10 in a predetermined manner and a proportion of the beam (14, 14') should pass through the element 11 without deviation. The element 11 should also be constructed so as to inhibit the formation of unwanted images which may be visible to the subjects, and which occur notably when some proportion of the incoming beam (A,B) is not deflected by the element 11.

Figure 3:
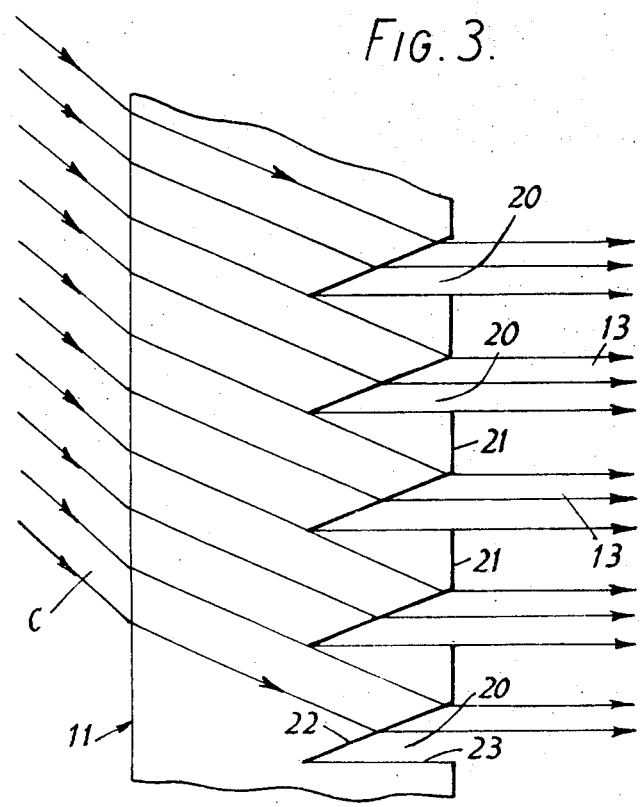
FIG. 3 is an enlarged side view of part of an optical element made in accordance with the invention and usable in the arrangement shown in FIG. 1.

One form of element 11, depicted on a much-enlarged scale in FIG. 3, is designed so that virtually all incoming light from the projector 12 is deflected. The element is a sheet of transparent plastics material, such as Perspex, provided with a series of grooves 20 separated by plain "window" areas 21. Each groove 20 forms a deflecting/diffusing area and has two faces 22, 23 disposed as shown. The face 23 extending approximately in the direction in which the light is passed from the element to the mirror 10 is provided with an opaque light-absorbing surface. The incoming beam, here denoted C and shown on a representative scale, is deflected by the grooves 20, as illustrated, and the areas 21 are masked or shadowed by the grooves 20 and receive no incoming light. The faces 22 of the grooves 20 are preferably corrugated to produce a degree of scatter of the transmitted light. The incoming light beam C is thus deflected by the grooves 20 towards the mirror 10 and a proportion of the reflected light (14 in FIG. 1) passes through the areas 21 substantially without deflection. A further proportion of the collimated light is incident on the grooves 20. This light is largely deflected in the general direction of the projector 12 and away from the observers.

Figure 4:
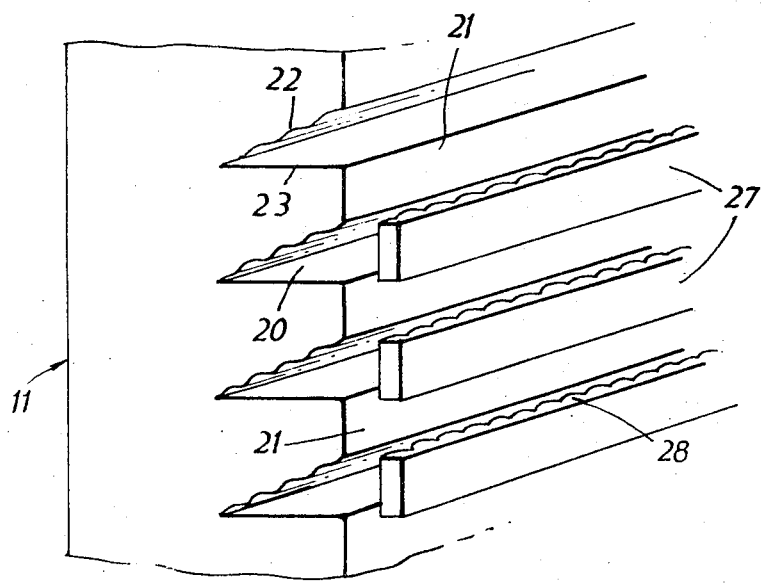
FIG. 4 is an enlarged perspective view of part of a modified optical element usable in the arrangement shown in FIG. 1.

FIG. 4 depicts a more refined construction for the optical element shown in FIG. 1, where like reference numerals as in FIG. 3 are used for convenience. The faces 22 of the grooves 20 are corrugated in a longitudinal direction only to provide a few degrees of vertical scattering of the incoming light. To provide some horizontal scattering diffusing plates 27 with a lenticular formation 28 on their inner faces are disposed across the grooves 20. The plates 27 may be designed to produce a pre-determined polar distribution of scatter.

Figure 5:
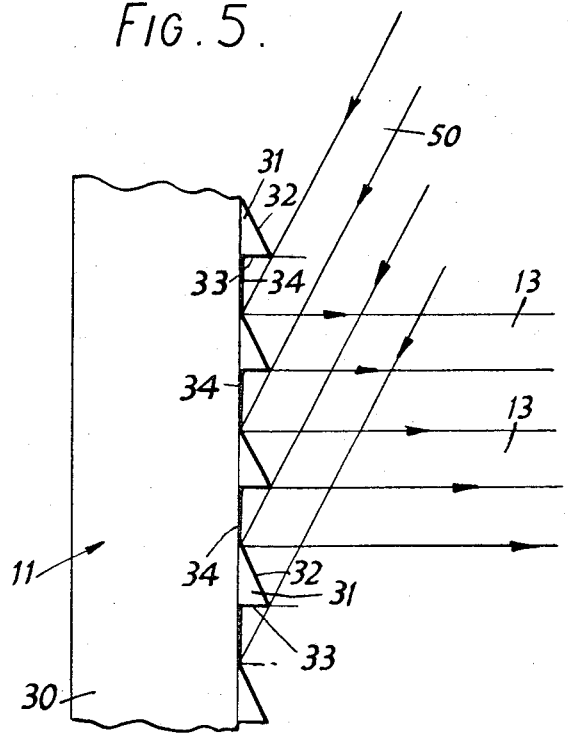
FIG. 5 is an enlarged side view of part of an optical element usable in the arrangement in FIG. 2.

FIG. 5 depicts a possible construction for the optical element 11 used in the FIG. 2 arrangement. As depicted in FIG. 5, the element is composed of a sheet 30 of transparent plastics material, such as Perspex, to which is attached on one face a number of elongated prisms 31 made of an opaque material. Each prism 31 however has its outer surfaces 32, coated with a reflective material and these surfaces 32, are preferably corrugated to produce scatter. The surfaces 33 of the prisms 31 are preferably coated with opaque material. The areas 34 between the prisms 31 act as windows as in the previously described constructions.

The incident light beam here designated 50 which in this case is reflected from the mirror 10 strikes the reflecting surfaces 32 of the prisms 31 and is reflected back to the mirror 10. The areas 34 are masked by the prisms 31 and hence little or none of the initially incident light passes through the element. A proportion of the light re-reflected by the mirror 10 passes through the areas 34 to the visual zone of the subjects as before. A further proportion of the light re-reflected by the mirror 10 is deflected and/or scattered by the surfaces 32 to be returned via the mirror 10 in the general direction of the projector 12, that is away from the observers.

Figure 6:
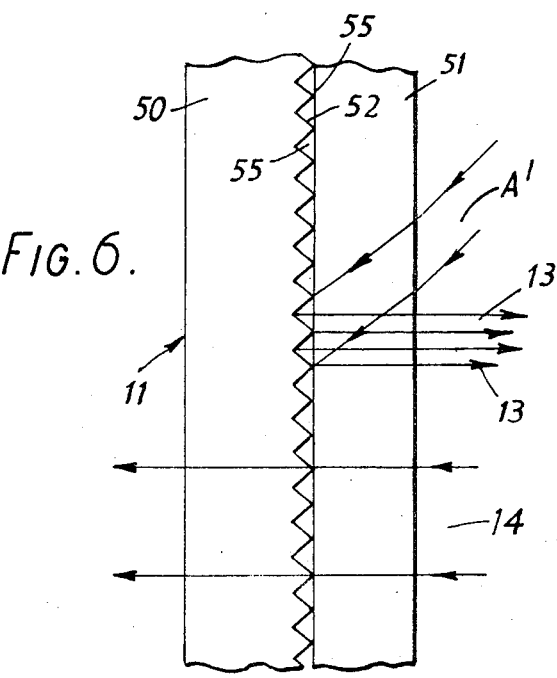
FIG. 6 is an enlarged side view of part of an optical element also usable in the arrangement shown in FIG. 2.

FIG. 6 depicts an alternative construction of the element 11 used in the FIG. 2 arrangement. As depicted in FIG. 6 the element 11 is composed of two sheets 50, 51 of transparent plastics material, such as Perspex, joined together by means of a cement 55, having a refractive index matching that of the sheet material. One of the cemented sheet surfaces, in this example that which belongs to the sheet 50 and designated 52, is machined or moulded to produce a fine sawtooth-like structure, whereas the other of the cemented sheet surfaces is smooth. The sawtooth-like structure of surface 52 is coated with a semi-reflecting film. A proportion of the incident beam A' (see FIG. 2) is deflected and/or scattered at the semi-reflecting layer of the element 11 radially towards the mirror as a beam 13. A further proportion of the beam A is transmitted through the element 11 without a large deflection, but this light is directed away from the observers and is lost. The beam 13 is reflected by the mirror 10 (FIG. 2) and a proportion of the resultant collimated reflected beam 14 is transmitted through the element without deflection. A further proportion of the collimated reflected beam is deflected and/or scattered by the element 11 substantially in a direction which takes it, via the mirror 10, back towards the projector 12. This light is lost and does not degrade the image seen by the observers.

The element 11 may alternatively take the form of a diffraction grating or hologram designed to give a proportion of deflection and/or scatter and a proportion of direct transmission in an analogous manner to that described.

The optical element 11 of the arrangements of FIG. 1 or FIG. 2 must have an array of alternate light-redirecting and window areas of sufficiently fine structure that, when the visual display is seen from the viewpoint of the observers, the collimated image is not degraded by too coarse an array structure. In practice, the permissible coarseness of the array structure is determined both by the geometry of the entire visual display arrangement and by the inherent resolution of the projected image. Thus, for example, if the projected image is provided by a television projector, the inherent resolution will be less than for an image provided by a cine-projector.

Instead of being non-varying and static, a movable element 11 can be used with a cathode-ray tube projector or cine-projector. In this case the element may be a concave sheet member having an array of comparatively large continuous areas which can deflect and/or scatter the incident light interspersed with comparatively large window areas. The sheet member is continuously vibrated or rotated at a speed such that the subjects are not aware of the relatively coarse structure of the member.

Referring again to FIG. 1, there is shown an oscillatory motor means 17 to which the optical element 11 is attached by a rod 18. Motor 17 operates to vibrate the element laterally transversely of its axis. Similar motor means may be provided for the element 11 of FIG. 2.

To eleborate, at each area of space occupied intermittently by the element the incident light is alternately deflected with scatter and permitted to pass without deflection. A proportion of the initially incident light is scattered and deflected in a generally radial direction towards the mirror. A proportion of each returning collimated beam is transmitted to the observers without deflection through the window areas of the element on one or both sides of the area from which the beam was originally scattered.

As before, some proportions of the initially incident light and the returning collimated light beams are lost without degrading the image. If the element 11 were stationary, only patches of the image would be seen from the observers' view points. As the element moves however, the visible patches move so that, due to the observers' persistence of vision, when the element is vibrated at sufficiently high speed, the entire picture scene is effectively presented continuously.

Another type of movable element 11 can be utilized where the projector is operated by a laser beam scanning system with a fast vertical scan and a slow horizontal scan. In this case a curved strip of metal or the like provided with a diffuse-scattering material, on one side is disposed vertically and moved in synchronism with the horizontal scan of the narrow beam emitted by the projector, so that the beam scans always along the strip. The display arrangement may be as depicted in FIG. 2 with the strip 11 carried by an arm 15 by which it is rotated, by rotary motor means 17 having a rotor shaft 18, about a vertical axis 20 extending between the centre of curvature of the mirror and the exit pupil 16 of the projector 10 so that the narrow beam reflected by the mirror 10 is scattered in a generally radial direction by the strip and re-reflected by the mirror 10 directly to the observers to pass on one or both sides of the strip.

Another type of element is static, but varies its characteristics with time. By way of example, the element 20 can in this case include a photochromic material which is normally transparent but becomes momentarily opaque when activated by high intensity light, produced by a laser. When activated by the beam from the projector 12, the photochromic material deflects and/or scatters the beam onto the mirror 10 as described hereinbefore and the collimated reflected beam, which is of insufficient intensity to activate the material, passes through the element without deflection towards the observers as before.

I claim:

1. A visual display arrangement for presenting a visual image to at least one observer comprising an optical projector, a concave mirror disposed to direct light to the view point of the observer, optical means, located substantially at the focal surface of said mirror for redirecting light associated with a real image formed by said projector, onto said mirror, to cause said mirror to form a virtual image at infinity, from said observer's viewpoint, said optical means being constructed to permit at least part of the light collimated by said mirror to pass therethrough towards the observer substantially without deflection.

2. A visual display arrangement as claimed in claim 1, in which the mirror is a concave spherical mirror disposed with its centre of curvature near the viewpoint of the observer and the optical means is a concave optical element having a radius of curvature about one half that of the mirror and disposed with its centre of curvature substantially coincident with the centre of curvature of the mirror.

3. A visual display arrangement as claimed in claim 2, in which the optical element is of non-varying optical construction comprising alternate light-redirecting and window areas.

4. A visual display arrangement as claimed in claim 3, in which the projector is disposed to project a real image onto the said optical element and the optical element is constructed of light-transmitting material with a front surface and a mirror-facing rear surface, said rear surface having a series of alternate grooves and window areas, said grooves each defining mutually-inclined groove faces, one said face being formed to scatter light from the projected image and to direct the scattered light towards the mirror, the other said face being opaque and the window areas comprising rear surface areas substantially normal to mirror radii therethrough, whereby light reflected from the mirror passes therethrough substantially without deflection.

5. A visual display arrangement as claimed in claim 4, in which said grooves extend horizontally across the rear surface of said optical element, said one groove face being of such depth as to screen an adjacent window area from incident light directly from said projected image and being formed to provide a determined angle of vertical scatter of incident light from said projected image, said grooves each having an associated lenticular member formed to provide a determined angle of horizontal scatter of light incident thereupon.

6. A visual display arrangement as claimed in claim 3, in which the projector is disposed to project a real image onto said optical element after reflection from said mirror and the optical element is constructed of light-transmitting material with a front surface and a mirror-facing rear surface, said rear surface having a series of alternate reflective and window areas, said reflective areas being formed to scatter light from the projected image and to direct the scattered light towards the mirror, and the window areas comprising rear surface areas substantially normal to mirror radii therethrough, whereby light reflected from the mirror passes therethrough substantially without deflection.

7. A visual display arrangement as claimed in claim 6, in which said reflective areas comprise elongated prism elements extending rearwardly from and horizontally across the rear surface of said optical element, said prism elements each defining mutually-inclined prism faces, one said face being formed to scatter incident light and to reflect the scattered light towards the mirror, the other said face being opaque and being dimensioned to screen an adjacent window area from incident light directly from said projector.

8. A visual display arrangement as claimed in claim 3, in which the optical element is static and comprises light-redirecting and window areas alternating with each other to form a fine pattern, whereby the structure of said alternating areas does not degrade the resolution of the virtual image viewed by the observer.

9. A visual display arrangement as claimed in claim 3, in which the optical element is vibrated by motor means in the direction transverse of said alternate areas and said light-redirecting and window areas alternate with each other to form a coarse pattern which would be apparent to the observer if the optical element were static.

10. A visual display arrangement as claimed in claim 2, in which the said optical element is a diffraction grating.

11. A visual display arrangement as claimed in claim 2, in which the said optical element is a hologram.

12. A visual display arrangement as claimed in claim 3, in which the optical element is of layered construction defining an internal interface, which interface has a sawtooth-like shape and is provided with a semi-reflective coating whereby a proportion of incident light is reflected therefrom rearwardly towards the mirror and in which the refractive indices of said layered media on the two sides of the interface are equal, whereby collimated light from the mirror is transmitted by the optical element substantially without deflection.

13. A visual display arrangement as claimed in claim 9, wherein the projector projects a scanned television image, in which the optical element is vibrated in synchronism with the television image scan.

14. A visual display arrangement as claimed in claim 1, in which the projector is operated by a laser beam scanning system with a fast vertical line scan and a slower horizontal frame scan, and in which said optical means comprises a curved strip of material having a light-scattering surface, said strip being vertically disposed and rotated about a vertical axis passing substantially through the centre of curvature of the mirror in synchronism with the horizontal scan, whereby the vertical scan coincides with the moving location of said light-scattering surface.

15. A visual display arrangement as claimed in claim 2, in which the optical element includes a photochromic material which is normally transparent and is rendered into a light-scattering state by intermittent high-intensity light illumination

* * * * *